Figure 1:
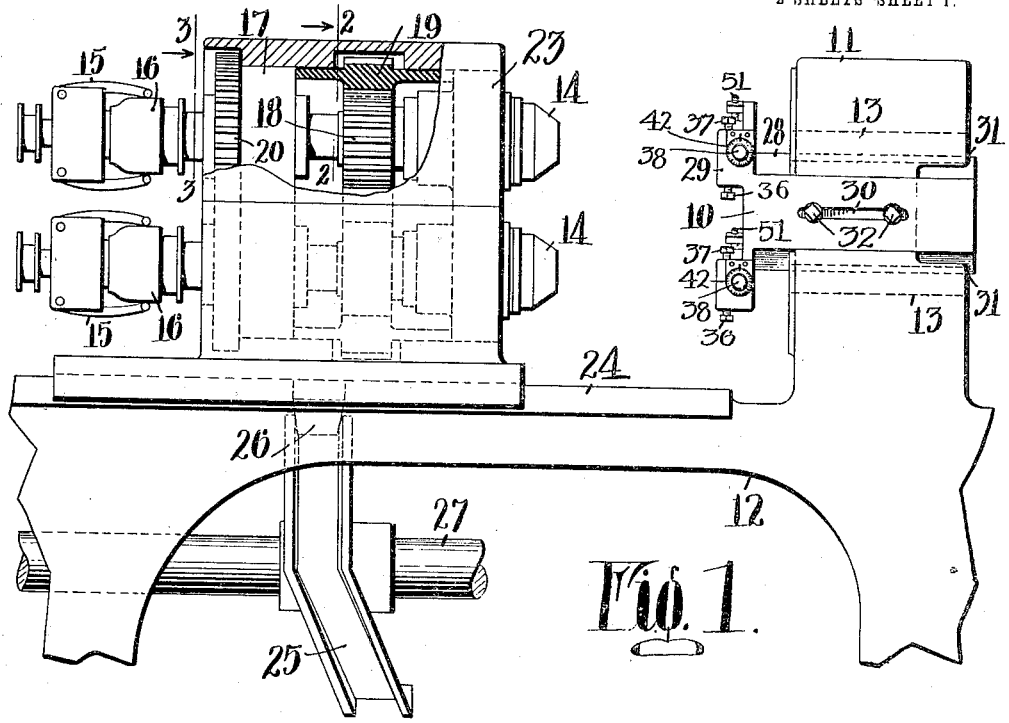

L. M. WAITE.
TOOL HOLDING DEVICE FOR LATHES.
APPLICATION FILED OCT. 31, 1913.

1,125,778.

Patented Jan. 19, 1915.

2 SHEETS—SHEET 1.

Witnesses:
M. Q. Healy.
C. F. Wesson.

Inventor:
Lyman M. Waite.
by attorneys.
Southgate & Southgate.

L. M. WAITE.
TOOL HOLDING DEVICE FOR LATHES.
APPLICATION FILED OCT. 31, 1913.
1,125,778.
Patented Jan. 19, 1915.
2 SHEETS—SHEET 2.
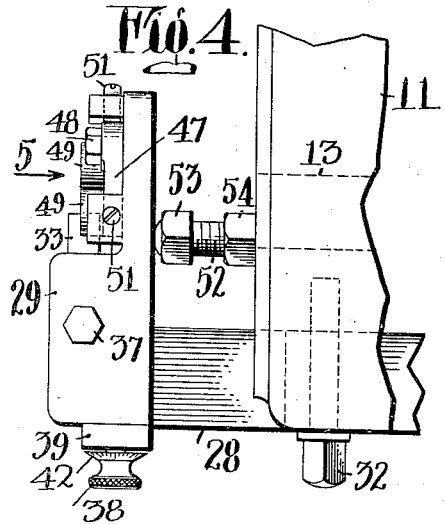
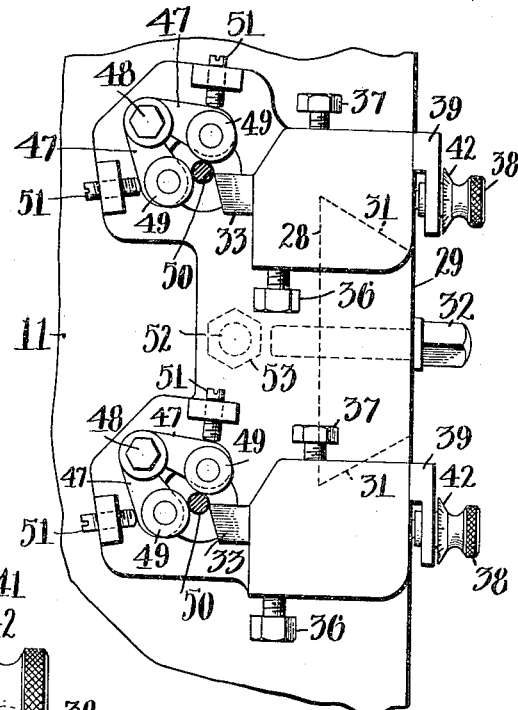
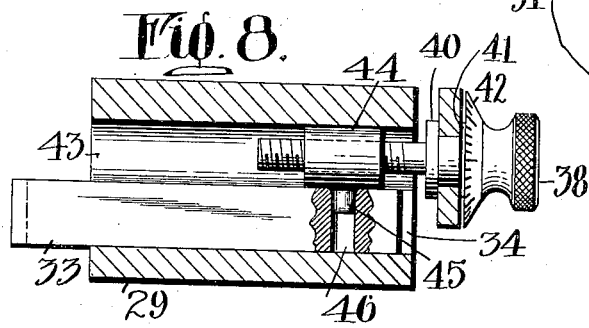
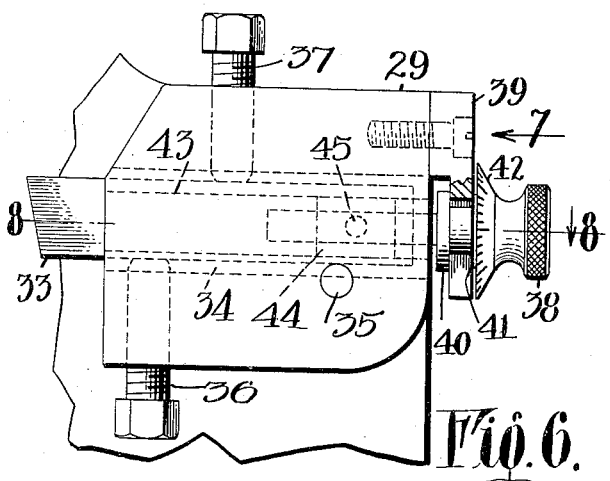
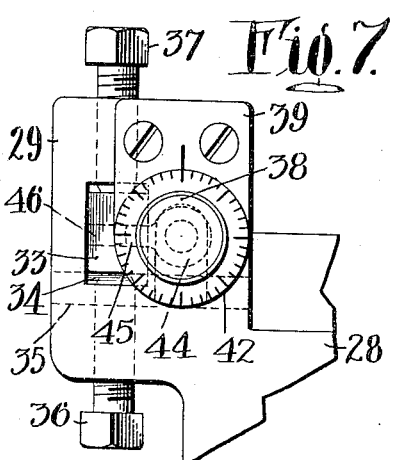
Witnesses:
M. C. Healy
C. F. Mason
Inventor:
Lyman M. Waite.
By Attorneys
Southgate & Southgate
THE NORRIS PETERS CO., PHOTO-LITHO., WASHINGTON, D. C.

# UNITED STATES PATENT OFFICE.

LYMAN M. WAITE, OF FITCHBURG, MASSACHUSETTS, ASSIGNOR TO FITCHBURG MACHINE WORKS, OF FITCHBURG, MASSACHUSETTS, A CORPORATION OF MASSACHUSETTS.

TOOL-HOLDING DEVICE FOR LATHES.

1,125,778.  Specification of Letters Patent.  Patented Jan. 19, 1915.

Application filed October 31, 1913. Serial No. 798,591.

*To all whom it may concern:*

Be it known that I, LYMAN M. WAITE, a citizen of the United States, residing at Fitchburg, in the county of Worcester and State of Massachusetts, have invented a new and useful Tool-Holding Device for Lathes, of which the following is a specification.

This invention relates to a tool holding device for lathes particularly adapted for use in a multiple spindle lathe of the type shown in Letters-Patent No. 926,736, issued July 6, 1909 to J. J. Grant.

In the machine shown in this patent, the usual box tools and boring tools are rigidly supported in a fixed tool head while the work is rotated and moved longitudinally relatively thereto. Each work holding spindle is also angularly adjustable through the medium of an indexing device so that the work may be successively presented to each of the different tools. This manner of supporting the tools in a non-movable tool head presents obvious and important advantages of operation resulting both from the rigidity of the tool supporting structure and from the permanent alinement of the same with relation to the work supporting devices. But the full realization of these advantages is to a considerable extent prevented by the limitations of the ordinary box tool, both as to rapidity of operation and also as to facility of accurate setting of the tool. It is characteristic of the box tool that the cutting member must longitudinally project or overhang from the tool head a distance greater than the length of the work upon which the tool is to operate, this overhang necessarily resulting in greatly reduced rigidity and rendering the taking of heavy and rapid cuts impossible.

It is the object of my invention to avoid the limitations of these inherent defects and to permit the advantages of the rigid tool head to be secured to the fullest extent, and to this end I have devised a tool holding device which possesses important features of construction and advantages in operation hereinafter fully described.

My improved tool holding device comprises a sliding bar of substantial cross section longitudinally adjustable on the rigid tool head and provided with means for securing a turning tool thereon.

My invention also involves a construction by which the transverse adjustment of the tool may be quickly and accurately performed, and the provision of means by which unusual strain may be transferred from the tool holder to the rigid tool head.

It is a further object of my invention to provide a tool holding device which shall permit the use of inexpensive cutting tools in place of the costly special tools heretofore used.

The above and other objects and advantages of my invention will be clearly apparent from the following description and the scope of the invention will be specifically pointed out in the appended claims.

A preferred form of my invention is shown in the drawings in which—

Figure 2:
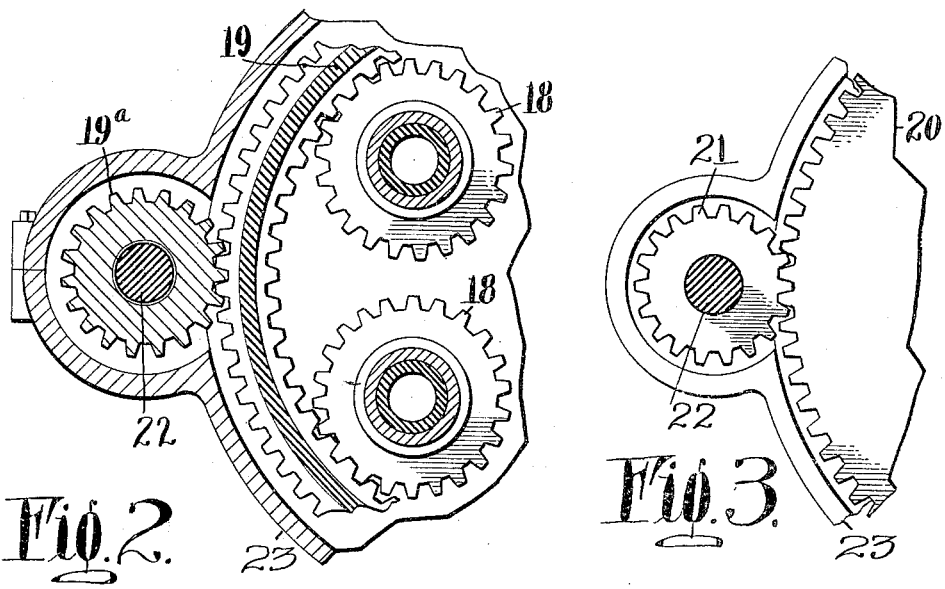
Figure 3:
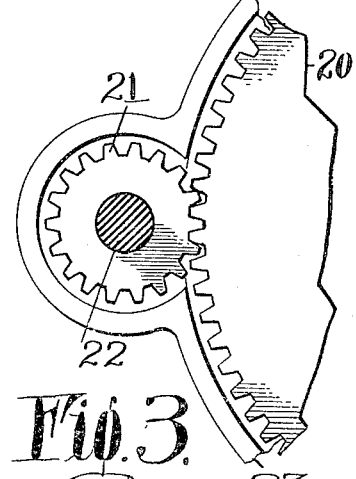

Figure 1 shows my tool holding device mounted upon a multiple spindle lathe of the type shown in the Grant patent: Figs. 2 and 3 are partial sectional views taken on the lines 2—2 and 3—3 in Fig. 1, showing the mechanism for rotating and indexing the work holding devices: Fig. 4 is a top plan view of my tool holding device, one end of the sliding bar being broken away: Fig. 5 is an end elevation looking in the direction of the arrow 5 in Fig. 4: Fig. 6 is a partial elevation similar to Fig. 5 but on an enlarged scale and showing the tool adjusting devices in detail: Fig. 7 is a side elevation of one of the tool adjusting devices looking in the direction of the arrow 7 in Fig. 6: and Fig. 8 is a horizontal sectional view taken along the line 8—8 in Fig. 6.

I have shown my improved tool holding device 10 as mounted upon a rigid tool head 11 preferably formed integral with the frame 12 of a multiple spindle lathe, but it should be understood that many of the advantages of my device may be equally well secured by its use upon a single spindle lathe.

The tool head 11 is provided with a plurality of sockets 13 indicated in dotted lines in Fig. 1 and adapted to receive the shanks of the usual boring and box tools. The work is rotatably supported in a plurality of work holding spindles 14 each provided with a chuck of ordinary design operated by arms 15 and sliding collars 16. Any suitable actuating mechanism (not shown) may be provided for intermittently moving the collars 16 to clutch and release the work.

The work holding spindles 14 are rotatably mounted within a cylindrical member 17 and are each provided with pinions 18, as shown in Fig. 2. A double ring gear 19 is also mounted within the member 17 and is provided with internal gear teeth meshing with the pinions 18 and with external gear teeth adapted to be driven by a pinion 19$^a$ actuated by driving mechanism not shown. Secured to the rear end of the member 17 is a gear 20 which is periodically given a partial rotation by a pinion 21 secured to a shaft 22 extending loosely through the pinion 19$^a$ and intermittently actuated by driving means not shown.

The cylindrical member 17 is rotatably mounted within a framework 23 which is adapted to be moved longitudinally upon ways 24 by a cam 25 co-acting with a cam roll 26 upon the lower side of the framework 23, the cam 25 being mounted upon a horizontal cam shaft 27.

No part of my invention is involved in the parts thus far described and for further details reference is made to the patent to Grant hereinbefore mentioned.

Referring more particularly to Figs. 4 to 8, my tool holding device comprises a sliding bar 28 having secured thereto a laterally projecting end 29 provided with means for adjusting and securing one or more turning tools thereon. The bar 28 has a slot 30 formed therein and is adjustably secured within ways 31 on the tool head by a pair of binding screws 32. The sliding bar is of substantial cross section and may be extended to any required distance from the tool head 11 without materially impairing the rigidity thereof.

In the form shown in the drawings, my tool holding device is provided with means for supporting a pair of turning tools in position to coöperate with stock presented in two successive positions of the work supporting head. The tools 33 are secured within longitudinal passages 34 in the projection 29, these passages having somewhat greater vertical dimensions than the turning tools and thus permitting vertical adjustment of the cutting point. The rear end of each tool is supported upon a pin 35 while the front end rests upon an adjusting screw 36. A clamping screw 37 upon the upper side of the tool is adapted to clamp the tool firmly upon the pin 35 and the screw 36.

To permit of rapid and accurate transverse adjustment of the tool relatively to the work, I have provided the devices shown in detail in Figs. 6, 7 and 8. This adjusting device comprises a threaded stud 38 mounted in a projecting arm 39 rigidly secured to the tool holding device, and closely fitting between the shoulders 40 and 41 of the stud 38. The stud is thus firmly held from longitudinal movement but is permitted to rotate within the arm 39. An index disk 42 may be provided on the stud 38 for accurately determining the amount which the stud is rotated and, by proper selection of the index divisions, this index may be caused to indicate the resulting movement of the tool in thousandths of an inch, or in any other preferred dimensions.

The tool holding projection 29 is provided with a cylindrical recess 43 parallel to the tool holding passage 34 and a threaded sleeve 44 is mounted to slide in this recess when moved longitudinally by rotation of the stud 38. A pin 45 projects from one side of the sleeve 44 into a hole 46 in the turning tool 33, thus providing a connection by which the stud 38 can move the tool 33 transversely of the work, after the clamping screw 37 has been loosened. The tool adjusting means above described is duplicated for the upper and lower tools, as shown in Fig. 5.

In order to support the work against the transverse thrust of the tool, a pair of swinging arms 47 is provided in connection with each tool, the arms being pivotally mounted at 48 upon the tool holder. Each arm is provided with a loosely pivoted roll 49 which is adapted to contact with the work (indicated at 50 in Fig. 5) and to prevent it from springing away from the point of the tool. Adjusting screws 51 are provided for retaining the arms 47 and the rolls 49 in desired position.

The tool holding device thus far described possesses great rigidity in comparison with the devices heretofore used but, in order to still further increase the rigidity of the construction, I provide an adjustable threaded stop 52 (Fig. 4) mounted upon the tool head and adapted to contact with the rear side of the tool holding projection 29. The stop 52 has a head 53 by which it may be turned for adjusting purposes and a check nut 54 secures it in adapted position. Under some conditions, it may be desirable to mount the stop 52 adjustably in the tool holding projection 29, the rear end of the stop then contacting with the front of the tool head.

The operation of the machine as a whole and of my improved tool holding device in particular has been indicated in the preceding description but may be briefly restated as follows:—The work is usually presented to a machine of this type in the form of long rods or bars which are inserted through the rear of the work supporting spindles 14 and are clamped therein through the operation of the clutch arms 15 and the sliding sleeve 16. The pinion 19$^a$ is then revolved transmitting its motion through the ring gear 19 to the pinions 18 and revolving each of the work holding spindles upon its own axis. The cam 25 then acts through the roll 26 to move the framework 23 along the ways 24 and to present the work to the tools mounted in the tool head 11. The work is thus rotated and moved longitudinally past the fixed turning tools 33 and as each bar is supported by the rolls 49, the tools are enabled to take a deep and rapid cut therein. The longitudinal thrust of the work against the tool holder is transferred from the tool holder to the rigid tool head through the medium of the adjustable stop 52.

While I have shown my tool holding device as mounted upon the front side of the tool head 11, it should be understood that the device may be equally well secured upon the top of the tool head or in any other convenient location, and furthermore, that the device may be duplicated to provide a turning tool for each of the spindle positions if so desired.

Having thus described my invention, it will be evident that many changes and modifications can be made therein by those skilled in the art, without departing from the spirit and scope of the invention, and I do not wish to be limited to the details herein described, but

What I claim is:—

1. In a lathe, in combination, a tool head, and a slide longitudinally adjustable on the head and having a tool holder projecting laterally at one end thereof, said head having an adjustable stop mounted therein and extending forwardly therefrom, to contact with the tool holding projection and support the tool against the longitudinal pressure thereon.

2. In a lathe, a tool holding device, comprising a longitudinally adjustable fixed slide and means for holding the slide in adjusted position, said slide having laterally offset tool holding means at one end thereof comprising guides for the tool, devices for adjusting the tool in said guides transversely of the lathe, and means for vertically adjusting and clamping the tool in the guides.

3. In a lathe, a tool holding device, comprising a longitudinally adjustable fixed slide, means for holding the slide in adjusted position, and means to hold a tool on said slide, said slide having a laterally offset portion at one end thereof supporting said tool holding means, said tool holding means comprising guides for the tool, devices for adjusting the tool in said guides transversely of the lathe, and means for vertically adjusting and clamping the tool in the guides, and said laterally offset portion also having devices mounted thereon for supporting the work against transverse pressure of the tool.

4. In a lathe in combination, a frame, means on said frame for supporting and rotating the work, longitudinally extended ways formed on said frame and fixed with relation to the axis of the lathe, a slide longitudinally adjustable in said ways, and means for securing a lathe tool to said slide.

5. In a lathe in combination, means for supporting and rotating the work, a fixed tool holder longitudinally adjustable in said lathe, means for supporting said holder in adjusted position, means for supporting and transversely adjusting a tool in said fixed holder and means for moving the rotating work longitudinally during the operation of the fixed tool thereon.

6. In a multiple spindle lathe, in combination, a tool head, a slide adjustably mounted thereon, and means for supporting a pair of turning tools on said slide in position to contact with the work presented in two successive operating positions.

7. In a lathe, a tool holding device having, in combination, a longitudinally adjustable fixed slide, means for securing a turning tool thereto, and means for adjusting the tool transversely of the lathe, said tool having an opening therein and said latter means comprising a rotatable threaded stud mounted to have no axial movement, a threaded sleeve thereon and a lug on said sleeve projecting into the opening of the tool, the rotation of the threaded stud causing both the sleeve and the tool to move transversely of the lathe.

8. In a lathe, in combination, a tool head, and a slide longitudinally adjustable in ways on the head and having a tool holder projecting laterally at one end thereof, said head and tool holder having a stop adjustably mounted in one of said parts and extending toward the other part to contact therewith and support the tool against the longitudinal pressure thereon.

In testimony whereof I have hereunto set my hand, in the presence of two subscribing witnesses.

LYMAN M. WAITE.

Witnesses:
  MARCUS A. COOLIDGE,
  HENRY J. FELDMAN.

Copies of this patent may be obtained for five cents each, by addressing the "Commissioner of Patents, Washington, D. C."